June 18, 1935.　　　　H. W. KAMACK　　　　2,005,087
METHOD AND MEANS OF SECURING SPUDS AND SIMILAR FITTINGS IN RANGE
BOILERS AND OTHER VESSELS, PIPES, ETC
Filed April 30, 1932　　　2 Sheets-Sheet 1
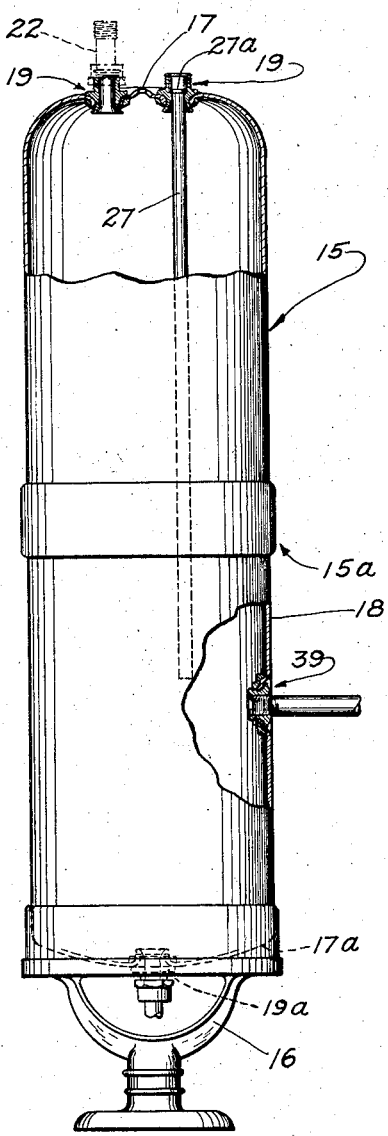
Fig. 1
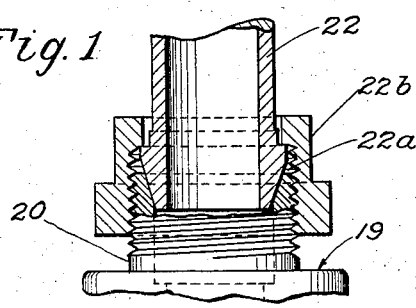
Fig. 1a
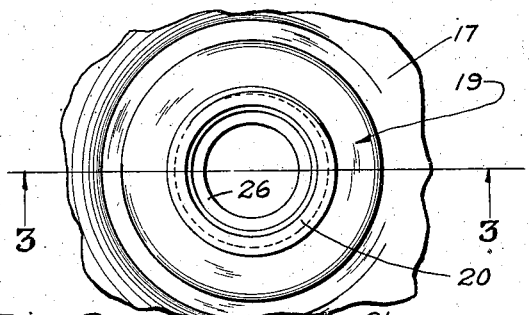
Fig. 2
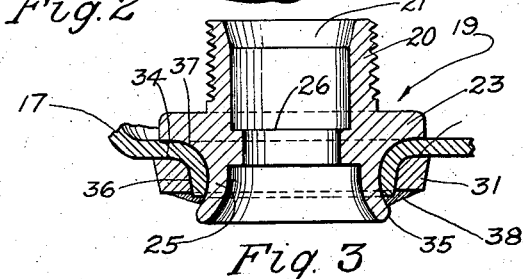
Fig. 3
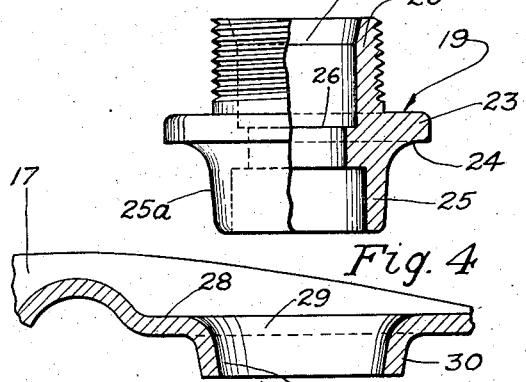
Fig. 4
Fig. 5
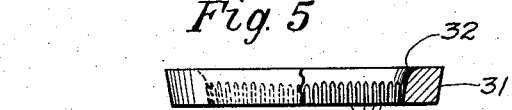
Fig. 6
Inventor
Henry W. Kamack
By Wooster & Davis
Attorneys June 18, 1935.  H. W. KAMACK  2,005,087
METHOD AND MEANS OF SECURING SPUDS AND SIMILAR FITTINGS IN RANGE
BOILERS AND OTHER VESSELS, PIPES, ETC
Filed April 30, 1932   2 Sheets-Sheet 2

Inventor
Henry W. Kamack
By Wooster & Davis
Attorneys

Patented June 18, 1935

2,005,087

UNITED STATES PATENT OFFICE 2,005,087

METHOD AND MEANS OF SECURING SPUDS AND SIMILAR FITTINGS IN RANGE BOILERS AND OTHER VESSELS, PIPES, ETC.

Henry W. Kamack, Waterbury, Conn., assignor to The American Brass Company, Waterbury, Conn., a corporation of Connecticut Application April 30, 1932, Serial No. 608,442

13 Claims. (Cl. 29—148.2)

This invention relates to new and useful improvements in method and means of securing spuds and similar fittings in range boilers and other vessels, pipes and the like, and has for an object to provide an improved method and means of securing said fittings whereby all strains on the fittings are distributed to and taken up by the material of the boiler, pipe or the like so that they are not concentrated on the edge of the hole in the boiler or the like, and also to remove the strains from the solder, solder being used only for sealing the connection.

Other objects and advantages will become apparent from a consideration of the following detailed description taken in connection with the accompanying drawings wherein satisfactory embodiments of the invention are shown. However, it will be understood that the invention is not limited to the details disclosed but includes all such variations and modifications as fall within the spirit of the invention and the scope of the appended claims.

In the drawings:

Fig. 1 is a side elevational view of a range boiler, parts being broken away to show the spud mountings;

Fig. 1a is a detail section showing how a nipple or pipe may be connected to the spud;

Fig. 2 is a detail top plan view on an enlarged scale and showing an end spud in place;

Fig. 3 is a sectional view taken substantially along the line 3—3 of Fig. 2;

Fig. 4 is a view partly in side elevation and partly in section and showing the end spud, the opening having been prepared in accordance with the invention;

Fig. 5 is a detail sectional view through a connection opening in an end of a boiler;

Fig. 6 is a view partly in side elevation and partly in section and showing a backing up or strengthening member or ring employed;

Figure 7:
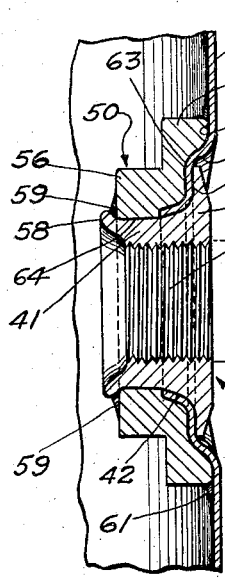
Fig. 7 is a vertical sectional view showing a modification in the form of a side spud secured according to the invention.
Figure 8:
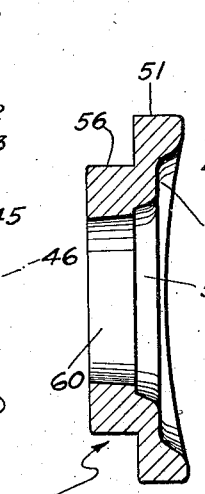
Fig. 8 is a sectional view through the backing up or strengthening member or saddle used in securing a side spud in place.
Figure 9:
Fig. 9 is a detail sectional view through a connection opening in a side of a boiler, the opening having been prepared in accordance with the invention.
Figure 10:
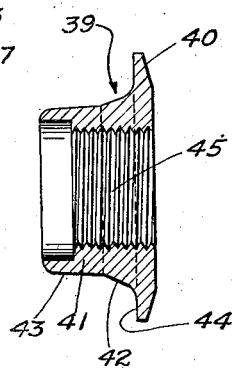
Fig. 10 is a sectional view through the side spud.
Figure 11:
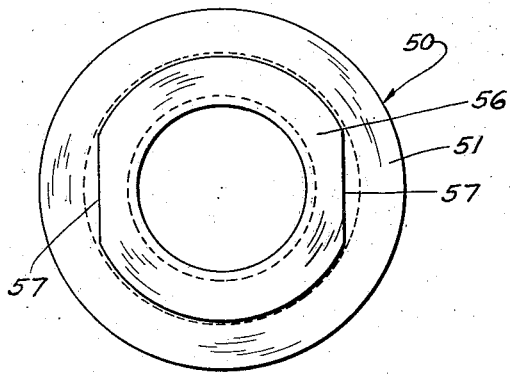
Fig. 11 is a rear elevational view of the saddle of Fig. 8.
Figure 12:
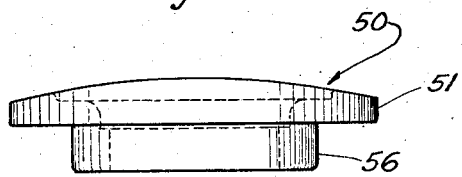
Fig. 12 is an edge view thereof.

Referring in detail to the drawings, and at first particularly to Figs. 1 through 6 thereof, at 15 is generally indicated a range boiler in connection with which the invention is disclosed. However, it will be understood that the invention is applicable to the securing of fittings to vessels other than range boilers and to pipes and the like. The boiler 15 may be of any preferred construction and as here shown is mounted on a stand 16 and includes a top or end wall 17 and a side wall 18. In its end 17 the boiler has secured a pair of fittings adapted to be connected with pipes for supplying the boiler with cold water and for the drawing off of hot water.

As here disclosed, a pair of spuds generally designated 19 form the fittings secured in the end wall 17 of the boiler and as these spuds are of the same or substantially the same construction a description of one and its mounting will, it is believed, suffice for both. Spud 19 includes an exteriorly threaded hollow stem 20 which adjacent its outer end may be tapered to provide a seat 21 adapted to be engaged by a tapered portion 22a of a connection for securing a pipe to the boiler as for example the nipple 22 of Fig. 1a and the nut 22b. Intermediate its ends the spud is enlarged to provide a body portion or flange 23 which at its underside provides a shoulder 24, the purpose of which will later more fully appear.

Inwardly of the body or flange 23 the spud includes a hollow neck 25 extending in a direction away from the body and tapered on its outer surface 25a as shown. A passageway is provided through the spud, the said passage extending through the hollow stem 20, body 23 and neck 25 and intermediate its ends this passage is somewhat restricted to provide a shoulder 26 adapted to be engaged by a flange 27a on a cold water pipe 27 whereby to support said pipe in the boiler as shown in Fig. 1.

The upper or top end of a boiler is usually rounded, and in preparing the boiler for the spud 19 a portion of the end 17 is flattened in dies as at 28 and this flattened portion is provided with an opening 29 the metal of the end wall about said opening being drawn inwardly to provide an annular flange 30. This flange 30 is tapered particularly on its inner surface 30a as best shown in Fig. 5. A backing-up or strengthening member or ring 31 is provided and the inner wall of this ring is tapered and the upper inner edge of the ring is rounded off as at 32. Further, if desired, the ring may in its inner periphery be serrated or provided with teeth and grooves as at 33.

The bottom end 17a of the boiler is similarly rounded and spud 19a is pressed in in the same manner. Bottom spud, however, has clearance to permit insertion of anvil tool used in making middle joint indicated generally at 15a.

When the parts are provided as above described the ring 31 is disposed about the flange 30 in engagement therewith and in engagement with the inner surface of the wall 17 about this flange as shown at 34 in Fig. 3. The spud 19 is assembled on the wall or end 17 by disposing the neck 25 of the spud in the opening 29 in a position extending through and beyond the inner end of the flange 30. The internal diameter of the ring 31 is somewhat less than the external diameter of flange 30 such that the ring has a forced fit on the flange 30 and the external diameter of the neck 25 is somewhat greater than the opening 29 through the flange such that it has a forced fit in the flange 30. The fit between the ring 31 and the flange 30, and the neck 25 and the flange, is such that the parts are forced together on a power press or other suitable device to give a good tight or forced fit.

Before the parts are forced together as above described it is preferable that all of the surfaces which come in contact in the assembled device are tinned. That is, the inner and outer surfaces of the flange 30 are tinned and the shoulder surface 24 and outer surface of neck 25 are tinned, as are the inner and top surfaces of the ring 31. After the parts are forced together the inner end portion of the neck 25 of the spud is expanded as at 35 whereby to turn the free edge portion of the flange 30 outwardly and force it against the ring 31 and whereby to have the inner end portion 35 of the neck of the spud disposed outwardly of or overhang the inner surface and end of the flange 30. That is, the exterior diameter of the expanded portion 35 of the neck is greater than the interior diameter of the flange whereby the neck may not be drawn outwardly through the flange and whereby the shoulder 24 is held against the outer surface of the wall 17.

To complete the joint heat is applied to sweat the tinned surfaces together as along the heavy black lines 36 and 37 of Fig. 3. From this it will be seen that the parts are soldered together over an appreciable area whereby a good seal is provided. Should additional solder be required, it may, of course, be used and, as a matter of fact, molten solder may be permitted to run in between the parts to completely fill the joint. In Fig. 2 a ring or seal 38 of solder is shown as covering the inner edge of the flange 30 and sealing it to the outer surface of the expanded portion 35 of the neck and the lower inner surface of the ring 31.

It will now be understood that any strain tending to pull the spud outwardly of the boiler will result in a pressure on the flange 30 in a direction to spread said flange. However, as the flange is backed up by the ring 31 it will be prevented from spreading and the pressure of the strain will be taken up by the flange and the surrounding portions of the end wall 17. From this it will be seen that strains on the spud are not concentrated on an edge of an opening in the boiler wall but are taken up due to the mechanical construction of the joint by direct physical engagement between the parts and that solder is not depended on to secure the parts together. The strains tending to separate the spud from the boiler are distributed to the metal of the boiler and ring 31 so they are not on the solder, and the solder merely functions as a sealing means and but a small quantity of it is required. This makes a more reliable joint, because where the separating strains are on the solder it will creep particularly when the temperature is raised to that of hot water.

Further, it will be seen that the strains will not be concentrated on the edge of the hole 29. In prior constructions where solder must take care of the strain heavy masses of it have been used for holding and backing, and as the strain was on the solder it would creep as mentioned. This is particularly true when a soft solder is used in the vicinity of heat as in a range boiler designed to contain a supply of hot water.

Figs. 7 through 12 show a modified construction particularly adapted for mounting the spuds or other fittings in the side walls of a boiler, tank or similar device. In these figures but a portion of a side wall 18 of the boiler is indicated and the spud is generally designated 39. Spud 39 includes a flange or body portion 40 from the inner surface of which projects a hollow neck 41 having a standard taper (usually approximately 21°) on that portion of its outer surface designated 42 and the remaining portion 43 of its outer surface may also be tapered. Obviously, at its underside 44 the body 40 of the spud provides a shoulder. The spud 39 has a passageway through it and for a portion of its length this passageway is provided with the usual tapered pipe threads as at 45 for co-operation with the threads of a pipe 46 to be connected to the boiler.

The side wall 18 of the boiler is curved and for the present purpose a portion of this wall is flattened as at 47 and an opening 48 is provided through the flattened portion and an annular flange 49 drawn to extend inwardly of the boiler. Interiorly, flange 49 is tapered to cooperate with the tapered portion 42 of the exterior surface 40 of the neck of the spud and exteriorly the flange may be correspondingly tapered for a purpose to be described. The flattened portion 46 of the side wall of the boiler is preferably of a diameter somewhat greater than the diameter of the body 40 or flange 40 of the spud whereby when the parts are assembled the spud is disposed substantially entirely within the outer surface of the boiler whereby not to project and interfere with polishing and finishing of the boiler surface.

A backing-up or strengthening member or saddle 50 is provided at the inner side of the boiler and functions substantially the same as the ring 31 in the figures previously described. The saddle includes a body portion 51 of a diameter greater than the diameter of the inwardly pressed or flattened portion 47 and the outer edge portion of this body is adapted to engage the wall 18 of the boiler beyond the flattened portion thereof as at 52 in Fig. 7 and to also embrace the downwardly curved portion 53 of the wall formed when forming the flat 47. Also, the saddle 50 includes a surface portion 54 to engage the inner surface of the flattened portion 47, and a tapered or inclined seat portion 55 to engage the outer surface of the flange 49.

Additionally, the face of the saddle is shaped to conform to the contour of the inner surface of wall 18 and the saddle includes a short neck portion 56 flattened at its opposite sides as at 57 whereby it may be held by a tool in position against the inner surface of the wall of the boiler. In assembling the connection, the saddle 50 is disposed with the flange 49 seated against the tapered surface 55 of the saddle as above described. The spud 39 and the saddle are pressed into place under pressure, the diameter of the neck portion 41 of the spud being somewhat larger than the opening in flange 49 such that the spud must be forced into place. The outer surface of the portion 42 of the spud will press against the flange 49 forcing it into the seat 55 in the saddle, or that is there is a forced fit of the flange in the taper 55, and the neck of the spud will also have a forced fit in the tapered opening 60 in the short neck 56 of the saddle.

Before the parts are assembled the surfaces which contact or engage in the assembled device are tinned. After the parts are forced into place the inner end portion 58 of neck 41 is expanded as shown in Fig. 7 whereby the outer diameter of the said portion 58 is greater than the inner diameter of the short neck of the saddle. Further, the neck of the spud is forcefully crowded against and about the inner corner of the neck of the saddle. After the parts are forced together heat is applied and the tinned surfaces sweated together.

It will be apparent that when a spud or other fitting is secured in the wall as described in connection with Figs. 7 through 12 solder will be used only for sealing and that additional solder may be provided at 59 and 61, and also to fill the surfaces 62, 63 and 64 if necessary. Any strain on the spud tending to pull the same outwardly will be immediately transmitted to the saddle 50 and by the saddle to a large area of the wall of the boiler. Therefore, any strain is distributed over an appreciable area and is not concentrated on the edges of the opening 48 and is not taken up by solder which is used only as a sealing means.

Having thus set forth the nature of my invention, what I claim is:

1. In combination, a body including a wall having an opening therethrough, an inturned flange member about said opening, a backing member closely embracing the flange, and a spud including a hollow neck extending through said opening in the flange, the inner end portion of said neck tapering outwardly to overlie the inner end of one of said members and to provide a tapered outer wall on the neck to secure the spud in the opening.

2. In combination, a body including a wall having an opening therethrough, an inturned flange member about said opening, a backing member embracing the flange, a spud including a hollow neck extending through said opening, the inner end portion of said neck tapering outwardly to overlie the end of one of said members and provide a tapered outer wall on the neck to secure the spud in the opening, and solder sealing the surfaces between the members.

3. In combination, a body including a wall having an opening therethrough, an inturned flange about said opening, a backing-up member closely embracing said flange, a spud, said spud including a hollow neck extending through said opening and beyond said flange, the inner end portion of said neck being flared outwardly to a diameter greater than the interior diameter of the inner end of the flange to provide an inclined outer wall on the neck to secure the spud in the opening, and said backing-up member serving to prevent spreading of the flange on a strain being placed on the spud.

4. In combination, a body including a wall having an opening therethrough, an inturned flange about said opening, a spud, said spud including a hollow neck extending through said opening and beyond the flange, said spud including a shoulder portion engaging the outer surface of said wall about the opening therein, a backing-up member closely embracing said flange and engaging the inner surface of said wall about the opening therein, the inner end portion of said neck being flared outwardly to a diameter greater than the interior diameter of the inner end of the flange and having an inclined outer wall engaging the flange to secure the spud in the opening, and said backing up member serving to prevent spreading of the flange on a strain being placed on the spud.

5. In combination, a body including a wall having an opening therethrough, an inturned flange about said opening, said flange being internally tapered, a spud, said spud including a hollow neck, said neck being externally tapered and having a forced fit in said flange and extending beyond the flange, a backing-up member embracing said flange, the inner end portion of said neck being flared outwardly to engage said flange opposite the backing-up member and to a diameter greater than the interior diameter of the inner end portion of the flange to form an inclined outer wall engaging the flange to secure the spud in the opening, and said backing-up member serving to prevent spreading of the flange on a strain being placed on the spud.

6. In combination, a body including a wall having an opening therethrough, an inturned flange about said opening, said flange internally tapered, a spud, said spud including a hollow neck, said neck externally tapered and having a forced fit in said flange and extending beyond the same, a ring embracing said flange, said ring having teeth formed on its inner periphery engaging the flange, said neck having its inner end portion tapering outwardly to engage the flange opposite to the ring and about the teeth thereon, said tapering inner end portion of the neck having a diameter greater than the interior diameter of the inner end portion of the flange to prevent movement of the spud outwardly of the flange, and said ring serving to prevent spreading of the flange on a strain being placed on the spud.

7. In combination, a body including a curved wall having a flattened portion with an opening therethrough, an inturned flange about said opening, a saddle at the inner side of the wall comprising a member having an opening therethrough receiving said flange and engaging the outer surface thereof, said member also engaging the inner surface of the flattened portion of the wall, a spud, said spud including a hollow neck extending through said opening and beyond said flange, said neck extending through said saddle, and said neck inwardly of said saddle tapering outwardly to form a tapered outer wall engaging the saddle to prevent movement of the spud in a direction outwardly of the saddle.

8. In combination, a body including a curved wall having a flattened portion with an opening therethrough, an inturned flange about said opening, a saddle at the inner side of the wall comprising a member having an opening therethrough receiving said flange, said saddle engaging the outer surface of the flange and the inner surface of the flattened portion of the wall and extending beyond the inner end of said flange, a spud, said spud including a hollow neck extending through said flange and saddle, and said neck inwardly of said saddle being of a diameter greater than the diameter of the opening through the saddle and having a tapered outer wall to engage the saddle whereby to prevent movement of the spud in a direction outwardly with respect to the saddle.

9. In combination, a body including a curved wall having a flattened portion providing a shallow recess, said wall having an opening through said flattened portion, an inturned flange about said opening, a saddle at the inner side of the wall comprising a member having an opening therethrough receiving said flange, said saddle engaging the outer surface of the flange and the inner surface of the flattened portion of the wall and extending beyond the inner end of the flange, a spud having a shoulder portion disposed in said shallow recess, said spud including a hollow neck extending through said flange and saddle, and said neck inwardly of said saddle being of a diameter greater than the diameter of the opening through the saddle and having a tapered outer wall to engage the saddle whereby to prevent movement of the spud in a direction outwardly with respect to the saddle.

10. The method of securing a spud in a body having a wall, comprising forming an opening in a wall of the body, drawing a flange about said opening at the inner side of the wall, disposing a backing-up member at the inner side of said wall and about said flange, passing the neck of a spud through said opening and flange, expanding the inner end portion of the neck to a diameter greater than the diameter of the inner end portion of the flange, and providing an inclined outer wall on said neck portion engaging the flange to retain the spud in the opening.

11. The method of securing a spud in a body having a wall, comprising forming an opening in a wall of the body, drawing a flange about said opening at the inner side of the wall, disposing a backing-up member about said flange, forcing the neck of a spud through said opening and flange, expanding the inner end portion of said neck to a diameter greater than the diameter of the inner end portion of the flange and to provide a tapered outer wall engaging the flange to retain the spud in the opening, and then soldering the contacting surfaces of the flange and neck together.

12. The method of securing a spud to a body having a wall, comprising forming an opening in said wall, drawing a flange about said opening at the inner side of the wall, placing a backing-up member about the flange to prevent it expanding, passing the neck of a spud through said opening and the flange, expanding the inner end portion of said neck to a diameter greater than the inner diameter of the backing-up member, and providing an inclined outer wall on said neck engaging the backing-up member to secure the spud in the opening.

13. The method of securing a spud in a body having a wall, comprising forming an opening in a wall of the body, drawing a flange about said opening at the inner side of the wall, forcing a backing-up member having an opening of somewhat smaller diameter than the flange about said flange, forcing the neck of a spud of somewhat larger diameter than the opening through said opening and flange, expanding the inner end portion of said neck to a diameter greater than the diameter of the inner end portion of the flange to form a tapered outer wall to retain the spud in the opening, and then soldering the inner and outer surfaces of the flange to the neck and backing-up member respectively.

HENRY W. KAMACK.